J. H. HOOKER.
ROD PULLER.
APPLICATION FILED JAN. 4, 1913.
1,064,073.
Patented June 10, 1913.
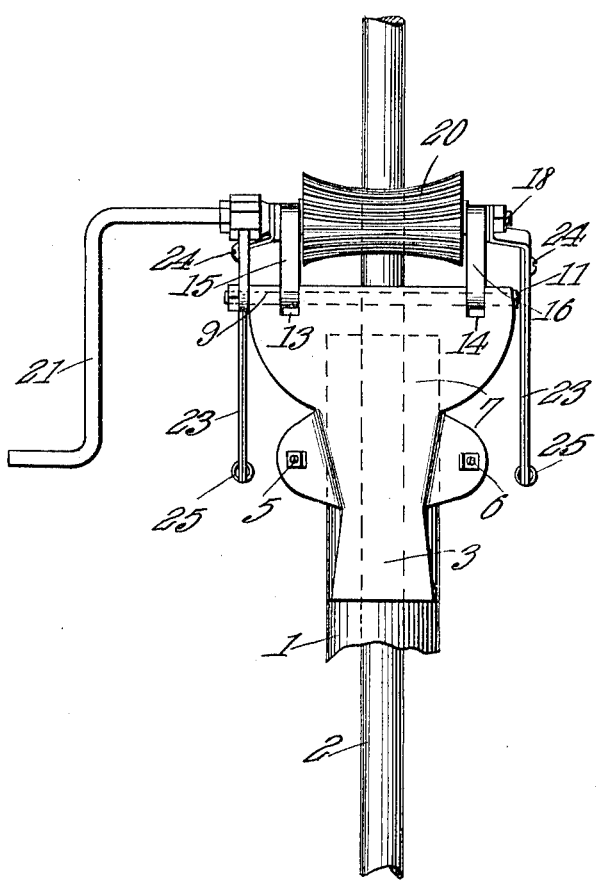
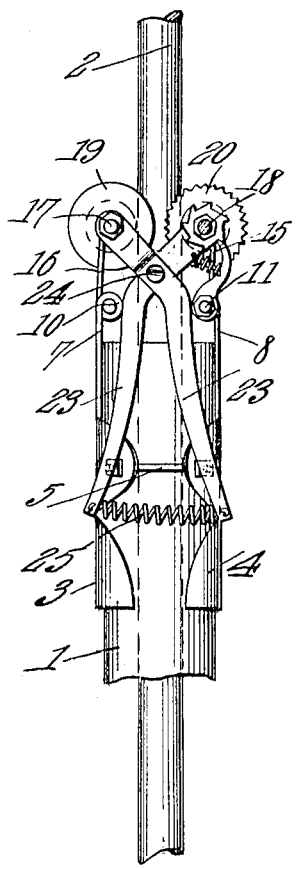
Fig.1.
Fig.2.
Witnesses
J.H.Hooker, Inventor
by
Attorneys

UNITED STATES PATENT OFFICE.

JAMES H. HOOKER, OF SILVERTON, TEXAS.

ROD-PULLER.

1,064,073.         Specification of Letters Patent.     Patented June 10, 1913.

Application filed January 4, 1913.  Serial No. 740,244.

*To all whom it may concern:*

Be it known that I, JAMES H. HOOKER, a citizen of the United States, residing at Silverton, in the county of Briscoe and State of Texas, have invented a new and useful Rod-Puller, of which the following is a specification.

My invention relates to a lifting device for pump-tubing, drill-rods, and the equivalents thereof.

An object of the present invention is to provide an improved device which may be readily positioned upon an outer piping and by means of suitable slotted rollers engage and lift a rod which is within the said piping.

A further object is to provide means whereby said rods may be held in any elevated position.

Another object is to provide means whereby the rollers will yieldably engage the rod surface and elevate the said rod without injury to the surface thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a front view in elevation of my improved lifting device positioned upon an outer pipe or tubing and in the act of raising a rod placed therein. Fig. 2 is a side view in elevation thereof.

Referring to the drawings in which similar reference numerals designate corresponding parts throughout the several views, 1 represents the outer pipe or casing such as is used in Artesian wells and 2 is a rod or smaller piping positioned within the first mentioned piping and which it is desirous to elevate. It is to be understood in this connection that 1 and 2 may be the exterior piping and the sucking rod of a windmill or similar device.

A split sleeve is composed of the sections 3 and 4, through extending ears of which extend the holding or clamping bolts 5 and 6. The upper portions of the sections 3 and 4 are bent outward and in a vertical plane as at 7 and 8 the upper ends of which are curled as at 9 and 10 to form casings or bearings for the pivoted rods 11 and 12 incased therein. The portions 7 and 8 of the sleeve are provided with the longitudinal slots 13 and 14 therein in which are positioned the pivoted arms 15 and 16, it being understood in this connection that there are similar slots and arms connected to the section 8 of the split sleeve. The upper ends of the arms 15 and 16 and the similar arms mounted upon the section 8 are provided with suitable bearings in which are journaled the shafts 17 and 18 upon which said shafts are mounted the arcuate rollers 19 and 20. The roller 19 is loosely mounted upon the shaft 17 and is provided with a uniform continuous surface. The roller 20 is provided with a series of longitudinal grooves or teeth formed upon the exterior surface thereof which are adapted to engage the rod 2 and secure a driving grip thereon. The said roller 20 is fixedly mounted upon the shaft 18 and is adapted to be rotated thereby, the said shaft being provided with an actuating handle 21 connected thereto.

In order that the rollers 19 and 20 may adapt themselves to rods of various diameters and furthermore in order that the rollers 19 and 20 may obtain a suitable grip upon the said rod and yieldingly hold the same, the cross arms 23 are provided which are pivotally connected as at 24 and are provided with suitable journal bearings which are adapted to engage the extremities of the shafts 17 and 18. The lower extremities of these arms 23 are formed with suitable apertures formed therein to which are connected suitable tension springs 25 from which it will be readily apparent that by reason of these springs 25 the rollers 19 and 20 will be compressed together in order to engage the rod 2 which is desired to be raised or elevated.

In order that the rod 2 may be maintained at any desired position of elevation a ratchet and pawl is mounted upon the shaft 18 and upon the rod 12. A suitable tension spring is provided in order to keep the pawl in active engagement with the ratchet and by this arrangement the rod 2 may be raised to any height and suitably held at such height. In order to allow the said rod 2 to drop back downward within the piping 1, the pawl may be brought out of engagement and the handle 22 turned in a reverse direction which will allow the rod 2 to slowly drop downward within the pipe or casing 1. If however, it is desired to effect a quick return of the rod or pipe 2 it is merely necessary to grasp the cross rods 23 adjacent their lower extremity and exert a suitable pressure thereon which will force the rollers 19 and 20 a distance apart and out of frictional engagement with the rod 2, the latter being thereby freed and will of itself drop back within the pipe or casing 1.

From the foregoing it will be apparent that I have provided an improved device for the lifting or elevating of rods or pipes and furthermore that the device may be readily mounted upon a circular casing or outer pipe and held securely thereto by means of suitable bolts.

The entire device is simple in its construction and one which will not easily get out of order. The cross arms and the manner in which the shafts 17 and 18 are mounted embodies a certain amount of resiliency in the device and the latter is therefore adapted to withstand jars and strains in a successful manner.

Having thus fully disclosed the construction of my improved device, what I claim to be new and original with me is:—

1. In an apparatus of the class described, a sleeve adapted to engage a cylindrical support, linked arms pivotally secured to the upper portion of said sleeve, rollers journaled within said arms, one of said rollers provided with a serrated surface, means for rotating said serrated roller, resilient means adapted to hold said rollers against the surface of a rod.

2. In an apparatus of the class described, a split sleeve the upper extremities of which are bent into a vertical plane, means for holding said split sleeve to a circular support, arms pivotally secured to the upper extremities of said sleeves and provided with shafts journaled at the upper extremities thereof, concaved rollers mounted upon said shafts, one of said rollers provided with a serrated surface and adapted to be rotated by said shafts, cross arms secured to said shafts and provided with a resilient spring adapted to force said rollers into contact with a cylindrical rod.

3. A rod puller comprising a split sleeve, the upper extremity of which is bent into a vertical plane, ears provided upon said split sleeve sections and provided with bolts extending therebetween adapted to hold said sleeve sections to a circular support, arms pivotally mounted to the upper portion of said sleeve and provided with shafts extending therebetween, a smooth concaved roller loosely mounted upon one of said shafts, a serrated roller secured to the other of said shafts and adapted to be rotated thereby, cross arms secured to the extremities of each of said shafts, a pivotal joint between said cross arms, a tension spring secured to the lower extremity of said cross arms and adapted to force said rollers into frictional engagement with a rod, means for preventing said serrated roller from turning in a reverse direction.

4. A rod puller comprising a split sleeve having bolts extended therebetween adapted to rigidly engage a circular casing, arms pivotally secured within slots provided at the upper extremities of said sleeve, shafts rotatably mounted within bearings at the upper ends of said arms, a concaved roller provided with a smooth continuous surface rotatably mounted upon one of said shafts, a serrated roller fixedly secured to the other of said shafts and adapted to be rotated thereby, a ratchet and pawl secured to said shafts and to said sleeves adapted to prevent a reversing of said serrated roller, cross arms journaled to the extremities of said shafts and provided with a pivotal joint therebetween, said cross arms extending downward from said pivotal joint and provided with a resilient helical spring secured to the extremities of said arms said springs adapted to force said rollers into active and frictional engagement with a cylindrical rod.

In testimony that I claim the foregoing as my own, I have hereto affixed my signature in the presence of two witnesses.

JAMES H. HOOKER.

Witnesses:
L. H. HODGES,
T. L. ANDERSON.